United States Patent
Brunetti et al.

(10) Patent No.: US 12,184,598 B1
(45) Date of Patent: *Dec. 31, 2024

(54) SYSTEMS AND METHODS FOR IMPLEMENTING EMAIL DELIVERY

(71) Applicants: Dana Brunetti, Los Angeles, CA (US); Kevin Spacey, Los Angeles, CA (US)

(72) Inventors: Dana Brunetti, Los Angeles, CA (US); Kevin Spacey, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/385,510

(22) Filed: Oct. 31, 2023

Related U.S. Application Data

(63) Continuation of application No. 18/100,951, filed on Jan. 24, 2023, now Pat. No. 11,888,802, which is a continuation of application No. 16/818,443, filed on Mar. 13, 2020, now Pat. No. 11,588,773, which is a continuation of application No. 15/948,468, filed on Apr. 9, 2018, now Pat. No. 10,637,812, which is a continuation of application No. 15/043,206, filed on Feb. 12, 2016, now Pat. No. 9,967,220, which is a continuation of application No. 13/826,544, filed on Mar. 14, 2013, now Pat. No. 9,306,887.

(51) Int. Cl.
*H04L 51/212* (2022.01)
*H04L 51/234* (2022.01)
*H04L 51/42* (2022.01)

(52) U.S. Cl.
CPC .......... *H04L 51/212* (2022.05); *H04L 51/234* (2022.05); *H04L 51/42* (2022.05)

(58) Field of Classification Search
None
See application file for complete search history.

(56) References Cited

U.S. PATENT DOCUMENTS

| | | |
|---|---|---|
| 6,389,028 B1 | 5/2002 | Bondarenko et al. |
| 6,609,653 B1 | 8/2003 | Lapstun et al. |
| 7,100,208 B2 | 8/2006 | Bhat |
| 7,197,640 B2 | 3/2007 | Meisel |
| 7,222,158 B2 | 5/2007 | Wexelblat |

(Continued)

FOREIGN PATENT DOCUMENTS

| | | |
|---|---|---|
| EP | 2107537 A1 | 10/2009 |
| WO | 2006102164 A2 | 9/2006 |

OTHER PUBLICATIONS

Sun et al., "Secure Web 2.0 Content Sharing Beyond Walled Gardens", Dec. 1, 2009, IEEE, 2009 Annual Computer Security Applications Conference (2009, pp. 409-418) (Year: 2009).*

(Continued)

*Primary Examiner* — Davoud A Zand
(74) *Attorney, Agent, or Firm* — Amster, Rothstein & Ebenstein LLP

(57) ABSTRACT

The invention relates to systems and methods for managing emails where an email server that may comprise one or more computer systems, and which may be part of an email system, receives an email addressed to a specified first user. The email server may analyze the received email and access one or more electronic databases, which may comprise information related to one or more respective registered users of the email system. The databases may be stored on one or more computer-readable storage media operatively connected to the email server.

16 Claims, 7 Drawing Sheets

(56) References Cited

U.S. PATENT DOCUMENTS

| | | | |
|---|---|---|---|
| 7,237,010 B2 | 6/2007 | Mora | |
| 7,249,175 B1 | 7/2007 | Donaldson | |
| 7,653,698 B2 | 1/2010 | Wieneke et al. | |
| 7,822,977 B2 | 10/2010 | Katsikas | |
| 7,873,996 B1 | 1/2011 | Emigh et al. | |
| 8,181,021 B2 * | 5/2012 | Ginter | G06F 21/42 |
| | | | 713/193 |
| 9,306,887 B1 | 4/2016 | Brunetti et al. | |
| 2003/0046408 A1 | 3/2003 | Weaver et al. | |
| 2003/0200267 A1 | 10/2003 | Garrigues | |
| 2003/0236847 A1 | 12/2003 | Benowitz et al. | |
| 2004/0122730 A1 * | 6/2004 | Tucciarone | H04L 12/1859 |
| | | | 705/14.66 |
| 2004/0240653 A1 | 12/2004 | Ramian | |
| 2005/0044154 A1 | 2/2005 | Kaminski et al. | |
| 2005/0108337 A1 | 5/2005 | Lorenz | |
| 2007/0204043 A1 | 8/2007 | Espinosa et al. | |
| 2007/0238449 A1 | 10/2007 | Park et al. | |
| 2008/0040441 A1 | 2/2008 | Maes | |
| 2008/0305815 A1 * | 12/2008 | McDonough | G06F 3/04842 |
| | | | 455/466 |
| 2009/0310764 A1 | 12/2009 | Gerhart | |
| 2010/0115040 A1 | 5/2010 | Sargent et al. | |
| 2011/0151890 A1 | 6/2011 | Platt et al. | |
| 2012/0221467 A1 * | 8/2012 | Hamzeh | G06Q 20/385 |
| | | | 705/40 |
| 2012/0260329 A1 | 10/2012 | Suffling | |
| 2012/0304256 A1 | 11/2012 | Evans | |
| 2013/0097250 A1 | 4/2013 | Zion | |
| 2013/0117400 A1 * | 5/2013 | An | H04L 9/3263 |
| | | | 709/206 |
| 2013/0238725 A1 | 9/2013 | Trinh et al. | |

OTHER PUBLICATIONS

David A. Wheeler, Countering Spam by Using Ham Passwords (Email Passwords), dated Jul. 8, 2004; revised May 11, 2011, retrieved from: http://www.dwheeler.com/essays/spam-email-password.html.

* cited by examiner

> To: sample@samplexyz.com
> From: Email System Handler
> Subject: Re: You sent email > We received an email sent from your email address at March 28, 2013 at 7:05 PM. Since neither you nor your email address has been authorized for direct delivery to this email user, your email has been placed in a queue.
>
> You are currently #213 in the queue. Your email will be delivered to intended recipient after the earlier queued emails have been delivered. If you are interested in advancing your order in the queue, please visit our website at www.[emailwebsite].com
>
> Thanks

FIG. 3A

To: sample@samplexyz.com
From: Email System Handler
Subject: Re: You sent email

You previously sent an email on March 28, 2013 to [individual]@[domain].com that was placed in a queue.

This message is to notify you that this email has been forwarded and delivered to intended recipient. Thanks for your patience.

Thanks

FIG. 5A

SYSTEMS AND METHODS FOR IMPLEMENTING EMAIL DELIVERY

FIELD

The present disclosure generally relates to systems and methods for screening and managing non-authorized emails.

RELATED APPLICATIONS

This application is a continuation of and claims the benefit of and priority to U.S. patent application Ser. No. 18/100,951, entitled SYSTEMS AND METHODS FOR IMPLEMENTING EMAIL DELIVERY and filed Jan. 24, 2023, which in turn is a continuation of and claims the benefit of and priority to U.S. patent application Ser. No. 16/818,443 now U.S. Pat. No. 11,588,773, entitled SYSTEMS AND METHODS FOR IMPLEMENTING EMAIL DELIVERY and filed Mar. 13, 2020, which in turn is a continuation of and claims the benefit of and priority to U.S. patent application Ser. No. 15/948,468 now U.S. Pat. No. 10,637,812, entitled SYSTEMS AND METHODS FOR IMPLEMENTING EMAIL DELIVERY and filed Apr. 9, 2018, which in turn is a continuation of and claims the benefit of and priority to U.S. patent application Ser. No. 15/043,206, now U.S. Pat. No. 9,967,220, entitled SYSTEMS AND METHODS FOR IMPLEMENTING EMAIL DELIVERY and filed Feb. 12, 2016, which in turn is a continuation of and claims the benefit of and priority to U.S. patent application Ser. No. 13/826,544, entitled SYSTEMS AND METHODS FOR IMPLEMENTING EMAIL DELIVERY and filed Mar. 14, 2013, now U.S. Pat. No. 9,306,887. The contents of these applications are incorporated herein by reference in their entirety.

SUMMARY

In embodiments, the invention relates to systems and methods for managing emails where an email server that may comprise one or more computer systems, and which may be part of an email system, receives an email addressed to a specified first user. The email server may analyze the received email and access one or more electronic databases, which may comprise information related to one or more respective registered users of the email system. The databases may be stored on one or more computer-readable storage media operatively connected to the email server.

In embodiments, the information related to the users of the email system may include profile information, including identification information for the respective registered users, whitelist information, indicating one or more individuals and/or email addresses approved to send email to the respective registered users, email message data, including email messages accessible to the respective registered users through an email interface, queue information, including queued email messages assigned queue positions and not being accessible to the respective registered users through an email interface, and password information, including whitelist password codes and queue advancement password codes for the respective registered users. The email server may then determine whether the received email is approved to be sent to the first user based at least in part on the whitelist information. The whitelist information may comprise the IP address of the originator of an email, the email address of the originator of an email, or alphanumeric codes associated with the originator of an email. Similarly, the same information may be stored for non-whitelisted email originators.

Following a determination that the received email is not approved, the email server may store the received email as a queued email message, and assigns a queue position to the received email. The email server may then send to a device associated with the received email, a notification message indicating that the received email has not been delivered to the first user and indicating the queue position of the received email. Upon receipt by the email server of a request to advance the received email queue position, the request including a queue advancement password code, the email server then may determine whether the received queue advancement password code is valid. The queue advancement password code may be provided to the originator of the queued email following the provision of monetary consideration or non-monetary consideration, in the form of, but not limited to, the viewing of an advertisement or registration with the email system. Based at least in part on a determination that the received queue advancement code is valid, the email server may update the queue information for the first user so that the queue position of the received email is advanced.

In embodiment, the invention also relates to methods and systems for accessing, by the email server, one or more electronic databases, which may be stored on one or more computer-readable storage media operatively connected to the email server. The databases may comprise information related to one or more respective registered users of the email system, including but not limited to profile information including identification information for the respective registered users, whitelist information indicating one or more individuals and/or email addresses approved to send email to the respective registered users, email message data including email messages accessible to the respective registered users through an email interface, queue information including queued email messages that may be assigned queue positions and not being accessible to the respective registered users through an email interface, queue preference information indicating one or more delivery preferences for the queued email messages becoming accessible email messages to the respective registered users.

The email server may determine, based at least in part on the queue preference information for the first user, whether a queue delivery time has arrived to convert one or more queued email messages to email messages accessible to the first user. The queue delivery time may be specified by the user via a date, a time period for which to maintain email messages in the queue, a limit on the number of email messages to maintain in the queue, the size of the queue in terms of computer memory, or any other means suited to the job. Based at least in part on a determination that the queue delivery time has arrived, the email server may identify one or more queued emails to convert to accessible email messages, also based at least in part on the queue preference information. The queue preferences may specify the number of emails to deliver from the queue, based at least in part on an absolute number, which may be set by the user or selected automatically by the email system, based at least in part on a percentage of the number of emails in the queue, based at least in part on a percentage of the user's inbox, or based at least in part on any method suited to the job.

After determining the number of emails to deliver from the queue, the email server may update one or more databases so that the one or more identified queued email messages are stored as email messages accessible to the first user. The email server may then notify the user by sending a message to an address or device associated with the user indicating that one or more queued email messages have been provided to the email account associated with the user.

DESCRIPTION OF THE DRAWINGS

The features and advantages of the present disclosure will be more fully understood with reference to the following detailed description when taken in conjunction with the accompanying figures, wherein:

FIG. 3A is an exemplary screenshot illustrating a notification according to exemplary embodiments of the present disclosure.

FIG. 5A is an exemplary screenshot illustrating a notification according to exemplary embodiments of the present disclosure.

DETAILED DESCRIPTION

In exemplary embodiments, the present disclosure describes systems and methods for implementing an email system for screening and managing emails.

Figure 1:
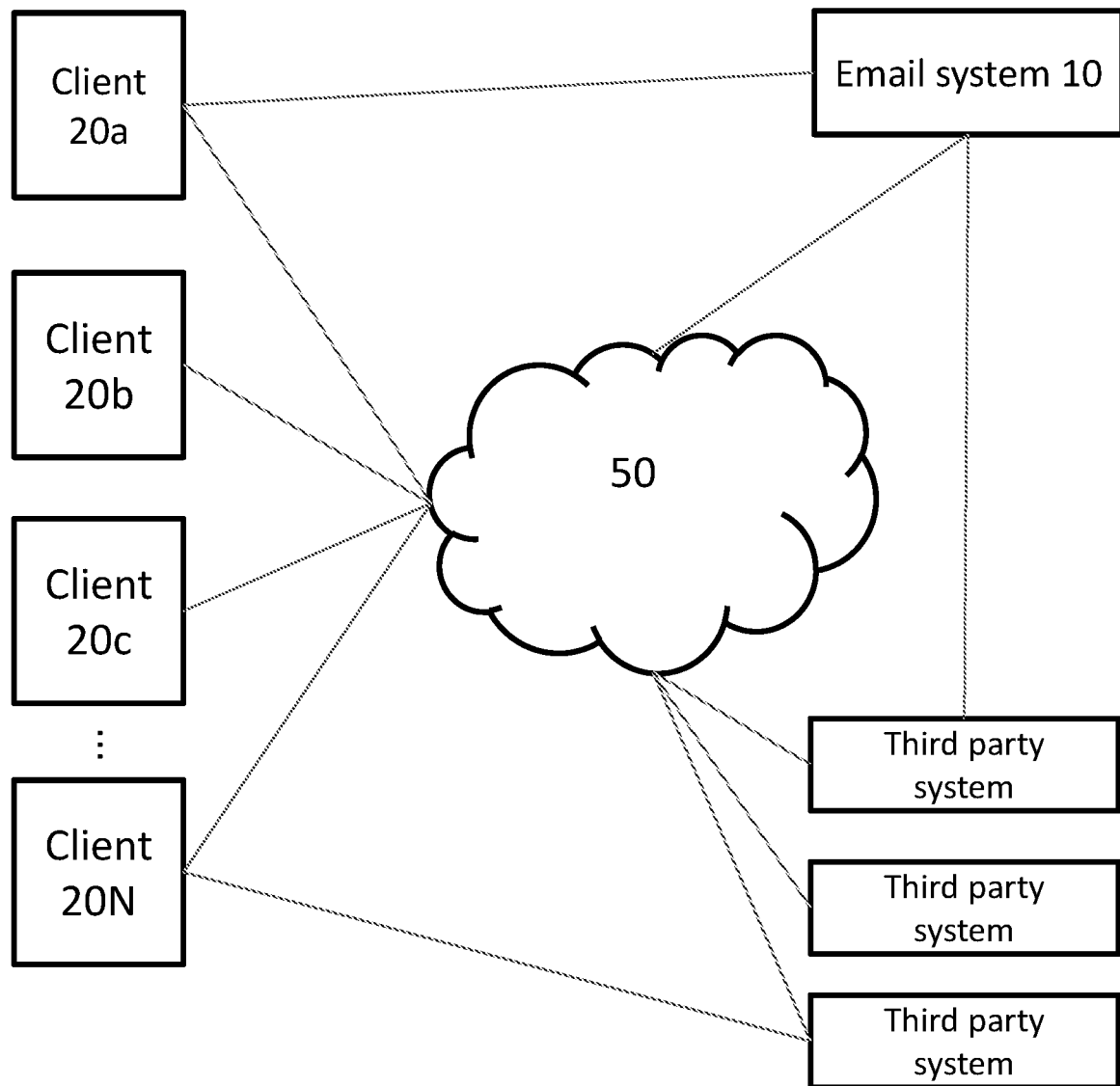
FIG. 1 is a schematic system diagram of an email system operatively connected to one or more client devices and one or more third party systems (optional) according to exemplary embodiments of the present disclosure.

FIG. 1 shows, according to exemplary embodiments, an email system, designated by reference number 10, which may be operatively connected to one or more client devices 20a, 20b, 20c, . . . 20N, collectively designated reference number 20. The one or more client devices 20 may be any devices including, for example, any type of desktop, laptop, smartphone (e.g., iphone, Android, Windows Phone, Blackberry, to name a few), tablet device (e.g., iPad, iPod Touch, Kindle, Android, Microsoft Surface, Chrome Book, to name a few), and/or any other suitable computing device(s), etc.

The email system 10 can operatively connect with one or more third party systems 30a, 30b, . . . 30N (collectively 30) in accordance with exemplary embodiments described herein. The third party networks 30 may be of information systems, businesses, organizations, individuals, content providers, web sites/web servers, media companies, cable/ISP providers, etc.

As illustrated in FIG. 1, each of the connections between the email system 10, the client devices 20, and/or the third party systems 50 may be made directly or indirectly. For example, such connections may be facilitated by be one or more networks, referenced herein as network 50 for convenience. The network 50 may include, for example, the Internet, a cellular network, WAN, LAN, Wi-Fi, or other private or public networks.

According to exemplary embodiments, the email system 10 may be implemented using web based email, POP email servers, IMAP email servers, MAPI email servers, and the like, to name a few. The email system 10 may implement one or more processes for screening, managing, and/or presenting email messages. In some exemplary embodiments, such processes may be implemented as add-on software that compliments an email program or client, such as, for example, Outlook, Sparrow, Thunderbird, etc.

Figure 2A:
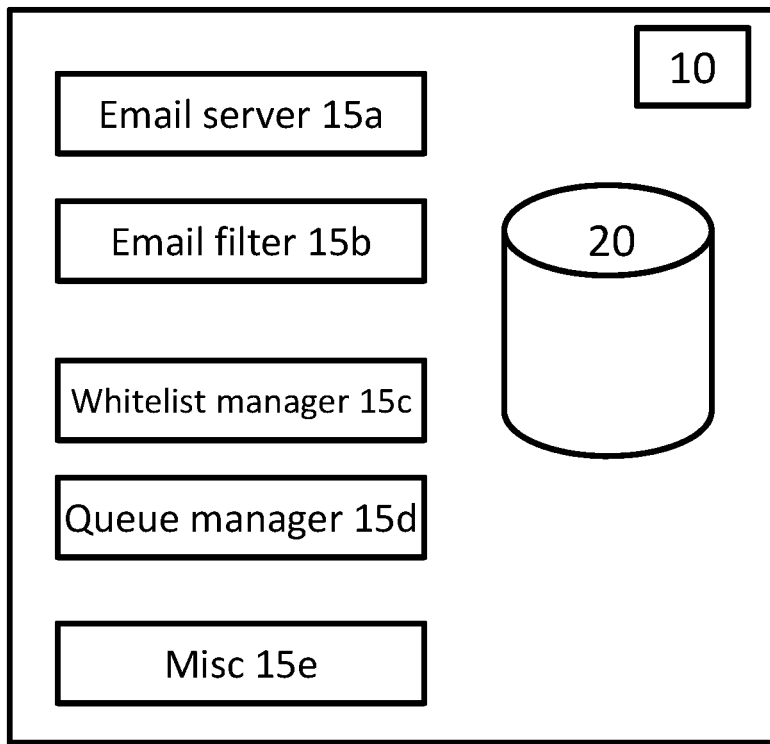
FIG. 2A is a schematic representation illustrating an email system and associated components according to exemplary embodiments of the present disclosure.

FIG. 2A shows, according to an exemplary embodiment, a block diagram representation of the email system 10. The email system 10 may comprise an email server component 15a, email filter component 15b, email parser 15c, whitelist manager 15d, a queue manager 15e, a miscellaneous component 15f, and one or more electronic databases 40. The one or more components, may be operatively connected to one or more computer networks 50, such as, for example, the Internet, or any other suitable network, via, by way of example, a set of routers and/or networking switches, to name a few.

The components of the email system 10 are shown to be located together in FIG. 2A. It is to be understood that in some embodiments the components of email system 10 may be combined or separated in any suitable manner. For example, one or more components may be located together on one or more computer systems that are operatively connected to other components of the email system 10.

In exemplary embodiments, the email server 15a may be configured to receive, obtain, store, retrieve, and the like, email messages. The email server 15a may be implemented using any suitable email protocols and using any suitable combination of hardware and/or software.

In exemplary embodiments, the email filter 15b may be any software and/or hardware processes for analyzing and/or determining the delivery location of received emails. For example, the email filter 15b may analyze incoming emails and determine whether the received emails are to be delivered to an inbox, to be sent to one or more folders, to be forwarded to one more other email addresses, to be blocked and/or to be sent to a spam folder, and the like, to name a few. In some embodiments, the email filter 15b may implement one or more processes to analyze the structure and/or content of the email message, including reviewing for and analyzing any of the IP Addresses associated with the email, the email address of the sender, one or more alphanumeric codes located within the email address, etc. In this regard, the filter may determine whether a particular email is associated or from an address that is authorized and/or "whitelisted". For example the email filter 15b may access a whitelist directory associated with the recipient user, so as to determine whether a received email is authorized. This may be accomplished by reviewing one or more of the incoming email's IP address, email address, alphanumeric codes, etc., and comparing to the whitelist directory to see if it is associated with a whitelisted entry.

In exemplary embodiments, the whitelist manager 15d may be responsible for implementing processes for utilizing and/or maintaining a whitelist associated with a user of the email system 10. In this regard, the whitelist manager 15d, among other features, may allow a user to specify one or more users to be whitelisted. The whitelist manager 15d may provide an interface allowing a user to manage entries in the user's personal whitelist directory. In some embodiments, the whitelist directory may allow a user to specify addresses. In some embodiments, the whitelist manager may electronically obtain a list of approved email addresses which are to be whitelisted. In some embodiments, a user through such an interface provided by the whitelist manager 15d, may specify that emails from one or more types of domains (e.g., [sample].com) are whitelisted. Further the interface may also allow a user to specify/generate whitelist codes, e.g., alphanumeric codes such as a PIN and the like, which are to be used by email senders to ensure that an email sent by them reaches the email user. In this regard, the whitelist manager 15d may generate such one or more codes which are to be distributed in any suitable manner. Such codes may be provided to the email system 10 and/or inserted in an appropriate location of emails sent to the user, so as to allow emails to be delivered to the intended user recipient. The code may be used to allow one or more email addresses to be whitelisted, and thus allow future emails from that address to be delivered to the recipient user, in accordance with embodiments described herein. In embodiments, the email system 10 or equivalent may use one or more of the methods, alone or in combination with other, and/or with other methods.

In exemplary embodiments, the queue manager 15e, may be responsible for implementing processes for managing queued emails. In embodiments, received emails addressed to a recipient user of the email system 10, may be blocked from delivery, and additionally, may be placed in a queue. In some embodiments, each of the emails that are queued may also be assigned and/or associated with a number and/or other signifier indicating the position of the emails in the queue. The queued emails may be ordered according to the time/date of when they are received in the email system.

In exemplary embodiments, the queue manager 15e may forward or deliver one or more queued emails to the inbox or other appropriate folder/destination associated with the intended recipient user. The queue manager 15e may forward one or a set of emails at various times. These times may be times that are evenly spaced apart, and/or one or more set times, for example, every 3 PM on Tuesday. In some embodiments, the queued emails may be forwarded to the recipient according to recipient user specified times.

The queued emails may be forwarded according to a FIFO (first in, first out) system. Other orders of priority may also be used. For example, a specified set number of emails (e.g., the 10 highest ranked emails, the top 10% highest ranked emails, etc.) may be forwarded at the specified times. The amount or number of emails forwarded may be set according to email system 10 and/or according to the recipient user. In some cases, the number of emails to be forwarded at a particular time may be dependent on the number of emails currently queued. In embodiments, the user may be able to set the number of emails to be forwarded either by total number, percentage or some other variable.

After forwarding one or more emails in the queue to the recipient user, the order of the remaining queued emails may be adjusted according to any suitable manner in accordance with embodiments herein.

While a FIFO-like system may be used for determining how to forward/deliver emails to the recipient user, other variations or other methodologies for determining which emails to forward may be used in accordance with embodiments disclosed herein.

In exemplary embodiments, the whitelist manager 15d may notify a sender that their email has been queued through any suitable manner (email, text, fax, automated telephone call, etc.). Such notifications may indicate the sender's email place in the queue, e.g., #500 out of 1000 emails, in one example. FIG. 3A shows an exemplary notification embodied as an email in accordance with embodiments herein.

In exemplary embodiments, the whitelist manger 15d may rearrange the order of queued emails. In some embodiments, the whitelist manager 15d may advance or skip some emails ahead. In such a case, a sender/originator of a queued email may influence or cause such email to advance in the queue. In this regard the sender/originator of email may be allowed to interact with the email system 10 so as to cause the advancement of the queued email. For example, the email system 10 may provide an interface for the sender to provide something, e.g., monetary consideration, registration with the email system, personal information, etc., in exchange for advancing the sent email in the queue. The level of consideration may determine how far the email is advanced in the queue.

In exemplary embodiments, the miscellaneous component 15f may implement any other processes needed to implement the email system 10 in accordance with embodiments disclosed herein.

According to exemplary embodiments, the one or more components 15a-f may be at least in part implemented by one or more computer processes. These components 15a-f may be stored separately or in combination with one or more other components on processor readable storage devices, which are operatively connected to one or more processors on one or more computers to run the software embodied as part of the engine. In particular, any software to implement processes herein may be stored on non-transitory computer readable storage media.

In exemplary embodiments, the ratings access system 10 may include a password gate engine 16, which may implement processes relating to creating and implementing password gates.

Figure 2B:
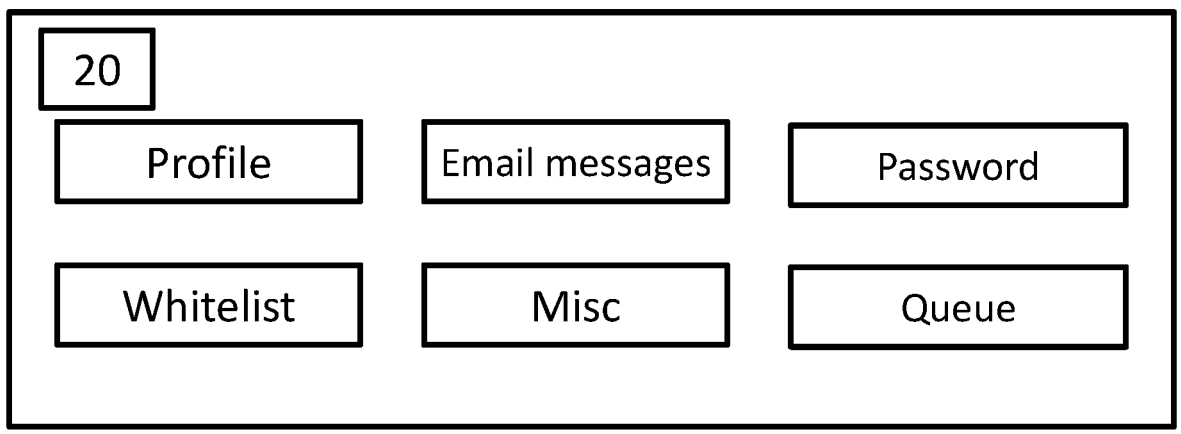
FIG. 2B is a schematic representation illustrating data stored by an email system according to exemplary embodiments of the present disclosure.

FIG. 2B shows, according to an exemplary embodiment, a block diagram representation of data stored in the one or more databases 40. In this regard, for each of the emails users, the database 40 of the email system 10 may include profile data 40a, email messages 40b, password data 40c, whitelist data 40d, non-whitelist data 40e, queue data 40f, and/or miscellaneous data 40g.

In embodiments, the profile data 40a may include data related to identifying a registered user of the email system 10, including, for example, information related to the user's name, email, address, demographic data, etc. The profile data may include an address book which includes contact information (e.g., email addresses, telephone numbers, residential addresses, etc.).

The email message data 40b, may be data including received, sent, and/or stored email messages. The password data 40c, may be information related to passwords (stored in some encrypted form, included hashes, for example) for registered users.

The whitelist data 40d, may include information related to whitelist settings. For example the whitelist data 40d may include people or email addresses which have been whitelisted. The whitelist data 40d may also include authorizing passwords or codes, e.g., codes to allow an email address or person and/or their sent address to be authorized and forwarded to the user.

The queue data 40f, may include information related to emails which have been placed in the queue. The queue information may include information related to the queued emails' order/slot/place in the queue. The queue data may have information indicating when the queue is to be advanced and which emails are to be sent out.

Figure 3:
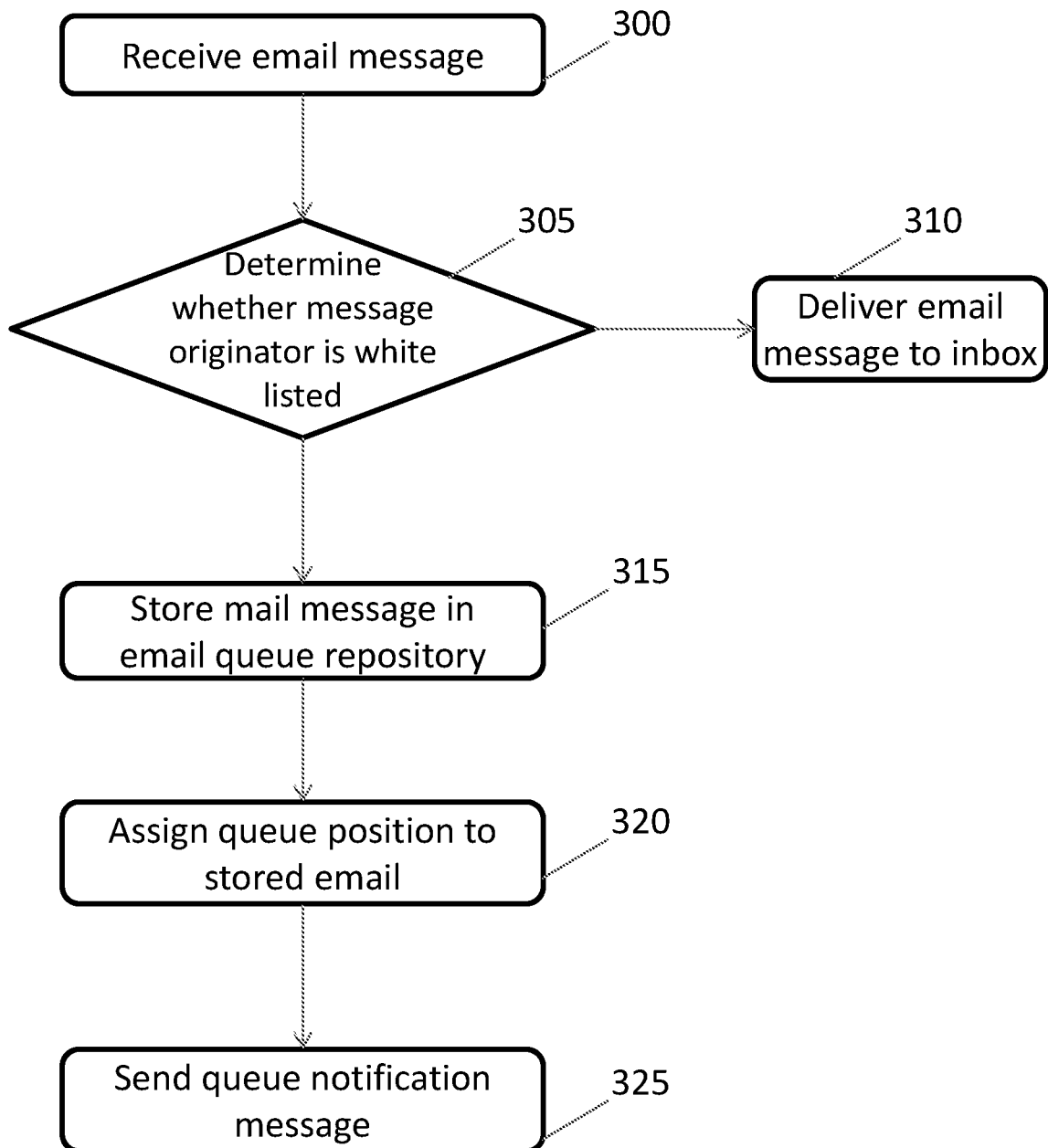
FIG. 3 is a flow diagram showing an exemplary method for processing emails in an email system according to exemplary embodiments of the present disclosure.

FIG. 3 shows according to an exemplary embodiment, an exemplary method for whitelisting emails. At step 300, the email system 10, may receive an email addressed to a recipient user. At step 305, the email system 10 may determine whether the email sender/originator is whitelisted. For example, the email system 10 may access a whitelist directory (for example from the database 40), which may contain email addresses, IP addresses, codes, individual names, and/or other information which may be used for identifying a received email as being approved or associated with an approved user. In this regard, emails which are approved and/or determined to be sent from approved users can be delivered to the recipient user's email inbox.

Various methods may be used for determining whether an email is to be approved and delivered to the recipient user's inbox. In some embodiments, a passcode may be inserted, for example, in a designated area of the received email. The email system 10 may determine whether a provided passcode/password is proper, e.g., whether it matches an approved passcode/password. The passcode/password may be unique to a particular individual/email address, for a group of individuals/email addresses, and/or may be used by anyone. In some embodiments, the passcode/password, may only be used once, by a sender. If the password is correct, then the originator/sender may be whitelisted, and subsequent emails associated with the originator/sender may be approved and delivered to the inbox and/or another appropriate folder. According to exemplary embodiments, any number of suitable methods may exist for a recipient user and/or for the email system 10 for whitelisting email senders. For example, one such method may include simply adding to a user's whitelist directory, individuals the user has emailed.

At step 310, if the received message is determined to be approved and/or authorized, the message may be delivered to the recipient user. For example, an approved email may be delivered to the inbox of the recipient user, may be sent to a folder associated with the user, may be forwarded to another email address, and/or another action may be taken or acted on the email according to the user's settings.

If at step 305 a received email is not approved and/or determined not to be from a sender who is whitelisted, then at step 315, the email system 10 may deliver, forward, store, and/or place the email in a queue. The queue may be an email repository for holding at least blocked or non-approved email messages. In some embodiments, a user of the email system 10 may access and/or retrieve queued emails intended for the user. In some exemplary embodiments, not all emails that are not approved may be queued. For example, such emails, including emails identified as containing a virus or the like may be automatically deleted or discarded by the email system 10. In another example, some emails identified as spam may be discarded and/or sent to a spam folder.

After placing the non-approved/non-authorized email in the queue, the email system 10 may assign a queue number to the email. The queue or queue repository may be part of the database 40. The assigned queue number may indicate queued emails positions and/or order in the queue. For example, if there already 20 emails in the queue, the most recently received queued email may be assigned a queue number of 21. Of course, the email system 10 may implement other methods for tracking or keeping the order of queued emails. In one example, queue numbers may be assigned relative to the position to a reference email, for example the first email in the queue. In another example, no queue numbers may be assigned, but rather order/position of queued emails may be determined or implemented based at least in part on how the email system 10 stores the queued emails, for example storing the emails in order of reception.

In exemplary embodiments, the email system 10 may by default assign queued emails according to a FIFO or related method. For example, in such a manner, the most recent queued email may be assigned a queue number (or other suitable indicator) that places the email last in the queue. However, in some embodiments, the email system 10 may not necessarily place a most recently received email at the bottom of the queue. For example, in some situations, the email system 10 may analyze the queued email, e.g., its contents (subject line, body, etc.), its sender email address, the domain from where it was sent, etc. and determine to place and/or assign the email somewhere else in the queue. For example, in the determination of where to assign/place a recently received email which is to be placed in the queue, the email may be assigned a queue number or a position in the queue which differs from the end of queue position or place. In this regard, one or more factors may be used to determine where to place the email in the queue. Such factors may be based at least in part on settings associated with the email system 10 and/or based at least in part on the user's settings.

At step 320, after storing and ordering the email in the queue, the email system 10 may send a notification message to the originator of the queued email using any suitable means, including, for example, text message, email, automatic voice call, fax, etc. The notification message may indicate to the originating sender information indicating the status of the email. In this regard, the notification may indicate that the email has been queued and may be delivered to the recipient at a later time and may indicate the email's place or position in the queue.

Figure 4:
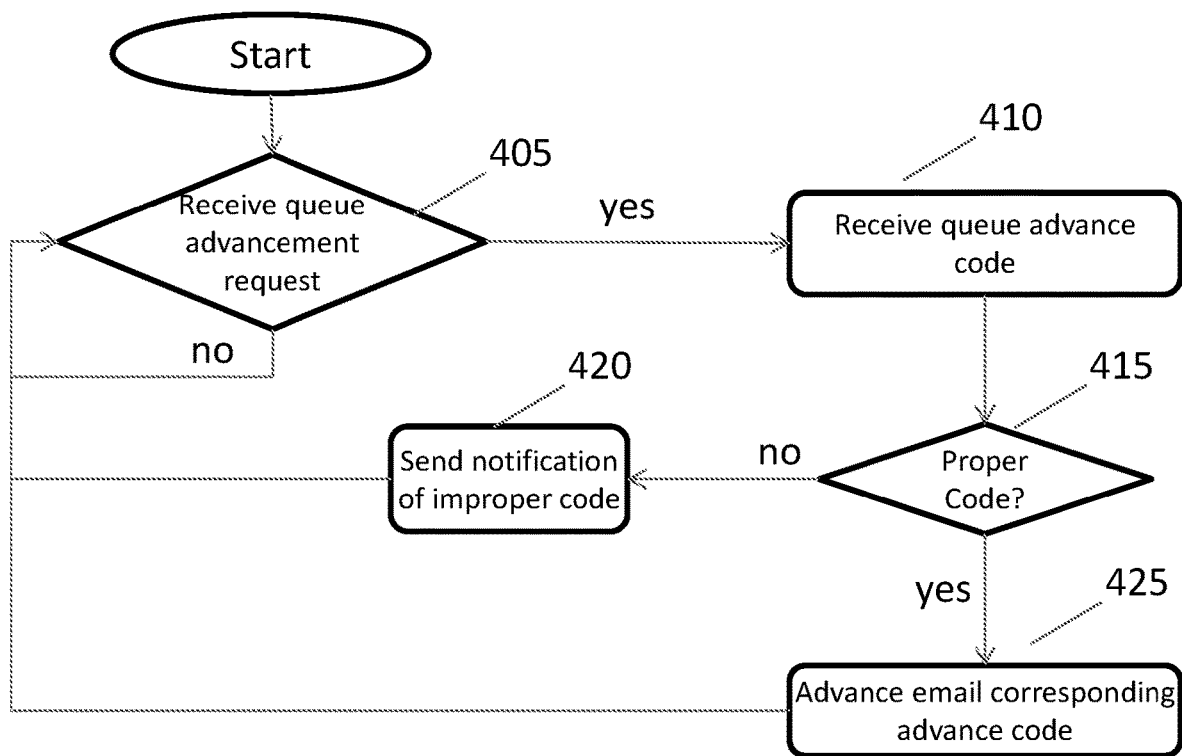
FIG. 4 is a flow diagram showing an exemplary method for processing emails in an email system according to exemplary embodiments of the present disclosure.

FIG. 4 shows according to an exemplary embodiment, an exemplary method for maintaining and/or processing queued emails which can be implemented by the email system 10. At step 405, the email system 10 may check and/or determine whether it has received an advancement request regarding an email which has been queued. In embodiments, the queued email advancement request may be received through an email, text, message, etc. In some embodiments, the advancement request may be implemented through an interface, including one provided through a webpage website via the Internet. The person who wishes to advance their email, may be required to provide information to identify themselves and/or the email they wish to advance. The advancement request may identify one or more particular emails to be advanced.

If the email system 10 receives a queued email advancement request, then, the email system 10 may require a code or some other input to advance the email. At step 410, the email system can receive a queue advancement code. The advancement code may be inputted to the email system 10 through an interface as previously mentioned, and/or may be transmitted to the email system 10 through any other suitable method. The person requesting advance may obtain one or more advance codes from the email system 10 and/or from the intended recipient user. For example, an individual requesting to advance an email, may provide some consideration, e.g., monetary consideration, non-monetary consideration, including, for example, viewing an advertisement, signing up for an account with the email system 10, etc., in order to receive an advancement code.

At step 415, the email system 10 may evaluate the received advancement code with respect to the one or more emails to which an advancement request has been specified. If at step 415 the provided code is valid, then the respective emails may be advanced in queue. For example, an email that was placed 50th in the email queue, may be placed at a higher priority position, e.g., 30th, 20th, 15th, 9th, 1st, and/or any other position in accordance with embodiments herein. In this regard, the advancement of one or more emails in the queue may cause other emails to be deprioritized, or moved lower in the queue. In some embodiments, a code or setting may prevent one or more emails from being prioritized or deprioritized. In one example, emails that have been advanced in response to the email system 10 receiving an advancement code may be prohibited or prevented by the email system from subsequently being deprioritized.

If at step 415, a provided code is determined by the email system 10 to be invalid, then at step 420, the email system 10 may provide a notification of the defective or incorrect code. The email system 10 may prompt the requesting party to reenter a code to provide a valid code.

Figure 5:
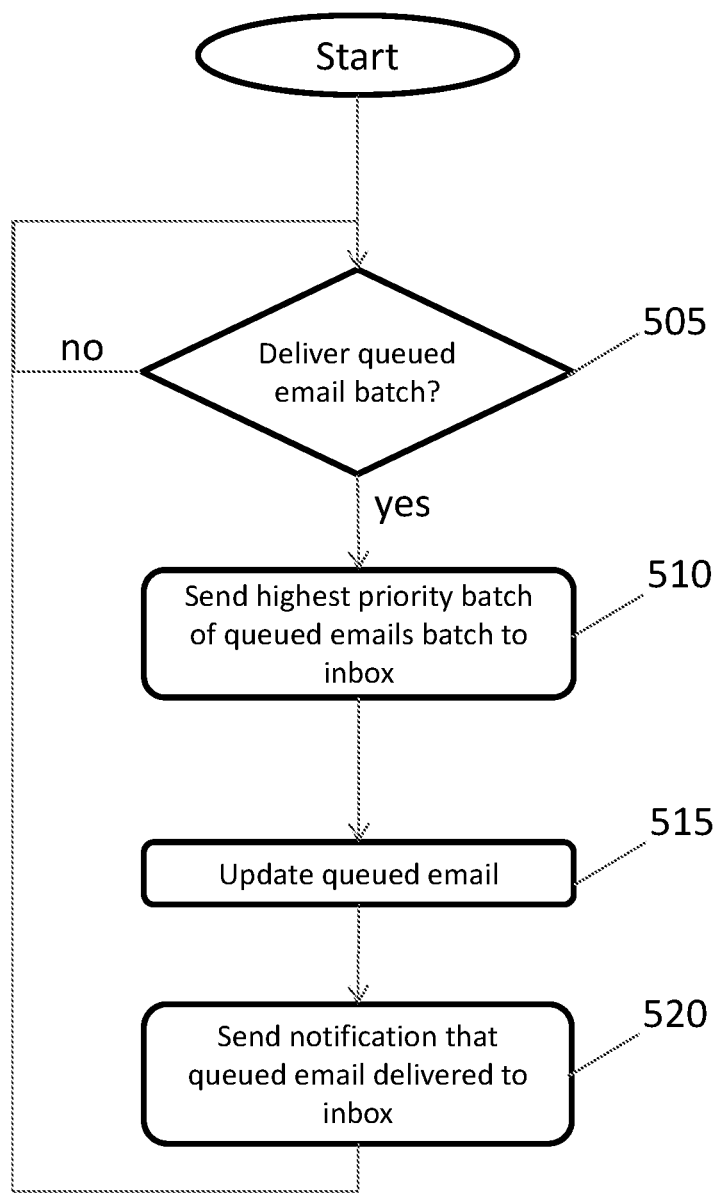
FIG. 5 is a flow diagram showing an exemplary method for processing emails in an email system according to exemplary embodiments of the present disclosure.

FIG. 5 shows according to an exemplary embodiment, an exemplary method for maintaining and/or processing queued emails which can be implemented by the email system 10. In this regard, at step 505 the email system may determine whether to provide and/or deliver one or more queued emails to the intended recipient user of the email system 10. As previously disclosed, one or more non-approved emails intended for a user of the email system 10 may not be delivered to the inbox (or any other suitable folder/area associated with the user's email account) and instead, may be placed in an email queue. Then, at various times the email system 10 may provide/delivery of one or more emails from the queue, which emails may then be delivered to the intended recipient user.

In exemplary embodiments, the email system 10 may decide when and how many queued emails to deliver to the intended recipient user. In some cases, the email system 10 may by default deliver queued emails at one or more intervals, such as, for example, every 15 minutes, every 30 minutes, every hour, etc., to the recipient user. In other cases, the email system 10 may delivery queued emails at one or more recurring times, e.g., 12 PM, or 12 PM on Tuesdays, or 12 PM on every other Tuesday, etc. In another example, the queued emails may be delivered in response to a request sent from the recipient user. In some embodiments, the queued email delivery times may be dependent on or a function of the number of emails in the queue with respect to the intended recipient user. For example, the email system 10 may schedule more queued email deliveries when there are a lot or an excessive number of emails in the queue, and/or may schedule less or less frequent queued email deliveries when there is a small number of emails in the queue.

If at step 505 the email system 10 decides to deliver one or more queued emails to the email system 10, then at step 510 the email system 10 may deliver a batch of emails. In exemplary embodiments, the email system 10 may deliver a designated set (one or more) of the highest priority emails, which may typically consist of the earliest queued emails not yet delivered to the recipient user. In some situations, the email system 10 may deliver a percentage of the highest priority emails (e.g., top 1%, top 5%, top 10%, etc.) or deliver a set number of highest priority emails (e.g., top 3, top 5, top 10, etc.). In some situations, the number of emails to be delivered may be dependent and/or vary with the number of emails in the queue. For example, when there is a large number of emails in the queue, the number of emails delivered in an email queue batch to the recipient user's account (inbox, folder, etc.) may be greater than at other times when the number of queued emails is smaller. As with other features, the recipient user may specify how many queued emails are to be delivered at one or more user specified times. In embodiments, queued emails may be delivered depending on the size of the inbox. For example, when the number of emails in the email inbox is large, queued emails may be delivered with less frequency. However when the number of emails in the email inbox is small, queued emails may be delivered with more frequency. In some embodiments, queued emails may be sent in response to one or more deletions of email from the email inbox.

After delivering an email queue batch, the email system 10 may update the email queue at step 515. With respect to the queued emails of a particular email user, after one or more queued emails have been delivered/forwarded to the user, then the remaining emails may be revised with their priority place/order adjusted accordingly. For example, if there had previously been 100 queued emails with 10 being delivered, emails previously assigned queue places or orders of 11-100 may be readjusted to 1 through 90. In some embodiments, variations of the reordering/readjusting may be implemented by the email system 10 in accordance with embodiments described herein.

At step 520, the email system 10 may send one or more notifications that queued emails have been delivered. Such notifications may be sent to the recipient user to indicate that they have new messages. In some embodiments, notifications may be sent to the originator of the previously queued email to indicate that their email now has been delivered to the intended recipient account.

In yet another exemplary embodiment, the email system 10 may implement various rejection options. The email system 10 may delete or reject option received emails system 10 for which a corresponding valid PIN/passcode is not concurrently or subsequently provided, emails that are not whitelisted, and/or emails in which the intended recipient has not previously emailed the senders. That is the email system 10, may or may not implement a queue.

In yet other exemplary embodiments, non-whitelisted emails may be placed in an email queue, but may be deleted if the sender of the email is not approved by the time the queued reaches a certain position. That is instead of delivering the email to the intended recipient user's inbox or other suitable location, the email is deleted unless the sender or recipient user takes an appropriate action, e.g., the sender provides a PIN, the recipient user adds the sender to the whitelist, the sender provides some consideration to the email system or recipient user, etc.

It will be understood that any of the above steps and/or elements can be combined and/or separated in any combination and/or separation thereof and/or taken in any order. For ease, the steps are described as being sequential and/or in order. This is merely for ease of understanding and is not in any way meant as a limitation.

Now that exemplary embodiments of the present disclosure have been shown and described in detail, various modifications and improvements thereon will become readily apparent to those skilled in the art.

What is claimed is:

1. A method comprising:
   a) receiving, at an email server of an email system, an email addressed to a first user of the email system, the email server comprising one or more computers;
   b) accessing, by the email server, one or more electronic databases stored on one or more computer-readable storage media operatively connected to the email server, the databases comprising information related to one or more respective registered users of the email system, the information comprising:

i. profile information including identification information for the respective registered users;
ii. whitelist information indicating one or more individuals and/or email addresses approved to send email to the respective registered users;
iii. email message data including email messages accessible to the respective registered users through an email interface;
iv. queue information including queued email messages assigned queue positions and not being accessible to the respective registered users through an email interface;
v. password information including whitelist password codes and queue advancement password codes for the respective registered users;

c) determining, by the email server, whether the received email is approved to be sent to the first user based at least in part on the whitelist information;

d) based at least in part on a determination in step (c), that the received email is not approved, storing the received email as a queued email message, and assigning a queue position to the received email; and e) providing, by the email server, to a device associated with a sender of the received email, an interface that is configured for input of consideration in exchange for advancement of the received email queue position.

2. The method of claim 1, wherein the consideration comprises monetary consideration.

3. The method of claim 1, wherein the consideration comprises registration with the email system.

4. The method of claim 1, wherein the consideration comprises input of personal information.

5. The method of claim 1, wherein the consideration comprises viewing of an advertisement.

6. The method of claim 1, wherein the interface is configured for input of a password for advancement of the received email queue position.

7. The method of claim 6, further comprising the steps of:
(f) receiving, at the email server, a password as input at the interface;
(g) determining, by the email server, whether the received password is valid; and
(h) based at least in part on a determination in step (g), that the received password is valid, updating the queue information so that the queue position of the received email is advanced.

8. The method of claim 6, further comprising the step of providing, by the email server, the password to the sender of the queued email following sending of monetary consideration by the sender.

9. The method of claim 6, further comprising the step of providing, by the email server, the password to the sender of the queued email following viewing of an advertisement by the sender.

10. The method of claim 6, further comprising the step of providing, by the email server, the password to the sender of the queued email following registration with the system by the sender for an account with the email system.

11. The method of claim 1, wherein step (c) comprises comparing an IP address of the sender of an incoming email to a database of whitelisted IP addresses.

12. The method of claim 1, wherein step (c) comprises comparing an IP address of the sender of the email to a database of non-whitelisted IP addresses.

13. The method of claim 1, wherein step (c) comprises comparing the email address of the sender of an incoming email to a database of whitelisted email addresses.

14. The method of claim 1, wherein step (c) comprises comparing the email address of the sender of an incoming email to a database of non-whitelisted email addresses.

15. The method of claim 1, wherein step (c) comprises comparing an alphanumeric code associated with the received email to a database of whitelisted alphanumeric codes.

16. The method of claim 1, wherein step (c) comprises comparing an alphanumeric code associated with the received email to a database of non-whitelisted alphanumeric codes.

* * * * *